United States Patent [19]

Sellner et al.

[11] Patent Number: 4,981,124
[45] Date of Patent: Jan. 1, 1991

[54] METHOD OF OPERATING A KNOCK-CONTROLLED INTERNAL COMBUSTION ENGINE

[76] Inventor: Hans-Joachim Sellner, Gartenstrasse 3, Kipfenberg, Fed. Rep. of Germany, D-8079; Friedrich Frye, Holunderweg 1, Erwitte, Fed. Rep. of Germany, 4782

[21] Appl. No.: 464,916

[22] Filed: Jan. 16, 1990

[30] Foreign Application Priority Data

Jan. 20, 1989 [DE] Fed. Rep. of Germany ....... 3901564

[51] Int. Cl.$^5$ .......................... F02P 5/14; F02P 5/145; G01L 23/22
[52] U.S. Cl. ..................................... 123/425; 123/435
[58] Field of Search ........................ 123/425, 435, 479; 73/35

[56] References Cited

U.S. PATENT DOCUMENTS

| | | | |
|---|---|---|---|
| 4,495,918 | 1/1985 | Sugiura et al. | 123/425 |
| 4,606,316 | 8/1986 | Komurasaki | 123/425 |
| 4,621,602 | 11/1986 | Furuyama | 123/425 |
| 4,633,835 | 1/1987 | Akasu | 123/425 |
| 4,770,143 | 9/1988 | Takahashi | 123/425 |
| 4,802,455 | 2/1989 | Abo | 123/425 |
| 4,903,664 | 2/1990 | Shinshi | 123/425 |

FOREIGN PATENT DOCUMENTS

| | | | |
|---|---|---|---|
| 0034028 | 2/1987 | Japan | 73/35 |
| 0005170 | 1/1988 | Japan | 123/425 |
| 0224466 | 9/1989 | Japan | 123/425 |

Primary Examiner—Willis R. Wolfe
Attorney, Agent, or Firm—The Dulin Law Firm

[57] ABSTRACT

Method for improving the operation of a knock-controlled internal combustion engine of the type having a fault recognition system for detecting failed knock sensors comprising the steps of incrementally shifting ignition timing in response to an appropriate output signal from the fault recognizer (assuming a failed knock sensor). The preferred method provides for monitoring engine RPM exceeding a threshold value, whereby the fault recognizer is activated thereby causing the ignition timing to be incrementally shifted (retarded) with an added safety margin to a preset anti-block value. Upon sudden reactivation of a failed knock sensor, the fault recognizer is deactivated and the ignition timing is incrementally shifting to the optimum knock-control value as controlled by the knock sensor. That is, the active knock sensor overrides the preset value, but the ignition timing override occurs incrementally. For RPM below the threshold value the ignition timing is incrementally set back to knock-free settings. All shifts to the ignition timing, being step-wise or incremental, create smooth transitions between operating conditions thereby eliminating sudden jumps or wild swings in torque which damage the engine and are unpleasant to the driver. In an alternate embodiment, the charge pressure of a turbo or super-charged engine is monitored for activating the same incremental knock-control operation.

20 Claims, 1 Drawing Sheet

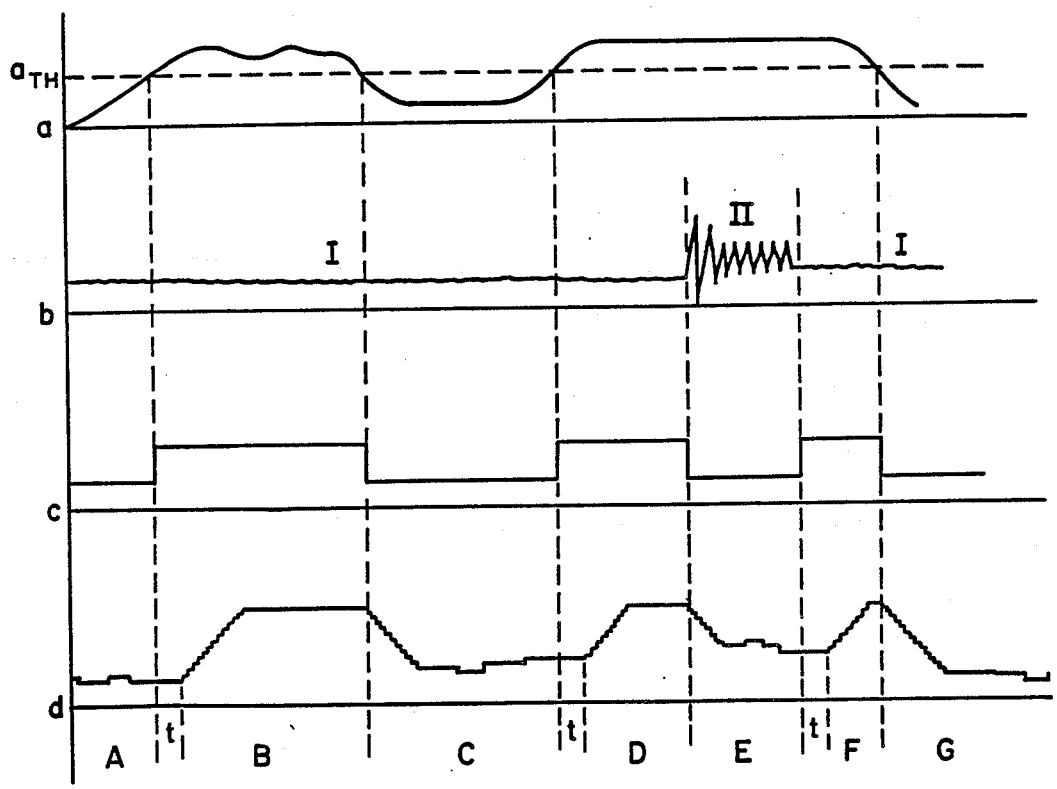

METHOD OF OPERATING A KNOCK-CONTROLLED INTERNAL COMBUSTION ENGINE

SPECIFICATION

The invention relates to a method for improving the operation of a piston knock-controlled, remote ignited (fired) internal combustion engine of the type having a fault recognition system for defective knock sensors. More particularly, the invention relates to methods for providing incremental shifts in the ignition timing to avoid dramatic jumps in engine torque in response to a failure in the knock sensor during the range of engine operating conditions that will result in knocking.

BACKGROUND AND INFORMATION DISCLOSURE STATEMENT

In knock controlled internal combustion engines (hereinafter "I.C. engines" or "ICE") it is important that the knock sensor is monitored for continued proper functioning, as a failure in the knock sensor gives rise to a danger that the ignition timing will shift toward premature ignition. In turn, premature ignition leads to functional disruptions and to the eventual destruction of the I.C. engine. Similarly, engine damage may occur if the knock control responds to the charge pressure of a supercharged I.C. engine.

It is known in the art that knocking may be substantially reduced by adjusting certain operating parameters under control. These parameters include the ignition timing or, as in the case of super or turbo-charged I.C. engines, the charge pressure.

These parameters are adjusted in a controlled manner only during certain engine operating conditions when knocking occurs. Such operating conditions include occurrence of engine revolutions (RPMs) higher then a predetermined threshold value when the ignition timing is not retarded soon enough, thus resulting in engine knock due to pre-ignition. In addition, engine knock may occur at elevated power requirements as is typical in super-charged I.C. engines. These methods of reducing engine knock in I.C. engines (by adjusting the ignition timing or charge pressure during knock-generating ranges) limit the ultimate performance of the engine. For the I.C. engine to remain operational under such controlled conditions, the I.C. engine must be operated well below its knock limit. Hence optimization of the I.C. engine's power and exhaust capabilities is compromised.

Another problem that arises under such operating conditions in conventional knock-controlled I.C. engines is the jump in torque that occurs in response to a sudden shift in the ignition timing when the operating mode of the I.C. engine goes from knock-free conditions into knock-susceptible ranges. Such a jump in torque is perceived by the driver as an unpleasant stall or a lurching movement as the I.C. engine is accelerated from low power or RPM ranges.

Other problems occur when a damaged knock sensor suddenly begins to work again. When the knock sensor becomes operational, the I.C. engine is reset from the controlled ignition timing setting to a controlled operation which is optimized near the knock boundary. As described above, an abrupt change in the operating condition of the I.C. engine occurs and is perceived as unpleasant by the driver due to the sudden change in ignition timing.

The prior art describes various methods to manipulate ignition timing in response to a failure of the knock sensor in order to eliminate knocking in knock-controlled I.C. engines. DE-A 34 45 177 discloses how to retard the ignition timing upon failure of the knock sensor through a corresponding fault-protection rectifier, in order to reliably avoid a knocking operation. This setting occurs jump-like to a fixed value.

DE-A 33 13 036 discloses how to create a knock control that allows incremental, step-like setting, but that is operated with faster control constants under sudden operating changes, such as occurs during accelerations.

Finally, DE-A 35 45 809 describes a knock control where a rough correction with fast ignition jumps is superimposed with a fine-tuned correction.

In practice it turns out that when monitoring knock sensors for failure, the response to such a failure is to adjust the operating parameter (ignition timing, charge pressure, etc) to a fixed value which often results in very powerful jumps in torque (surges and stalls) that can result in driving mistakes. Thus, there is a definite need in the art to provide a method that incrementally shifts ignition timing in response to a failure in the knock sensor or a sudden reactivation of a previously failed knock sensor in knock-controlled internal combustion engines so that dramatic jumps in torque are avoided.

THE INVENTION

OBJECTS

It is among the objects of the invention to provide methods for operation of a piston knock-controlled, remote ignited (fired) internal combustion engine by which dramatic and undesired jumps in torque are avoided by incrementally shifting the ignition timing or charge pressure in the ranges of operating conditions where engine knock occurs.

It is another object of the invention to provide methods for achieving very gentle torque transitions by incrementally shifting the ignition timing or charge pressure in response to a brief failure and subsequent reactivation of the knock sensor during knock-susceptible operating conditions thereby enhancing driving comfort and substantially reducing engine damage due to knocking.

It is another object of the invention to provide methods for improving the operation of a knock-controlled internal combustion engine by adding a safety factor in the incremental retardation of the ignition timing or charge pressure to prevent early ignition during transition from the operating conditions in the knock-free range to the knock-susceptible range.

It is another object of the invention to provide methods for improving the operating behavior of a knock-controlled internal combustion engine by adding, as a safety margin, a certain monitoring time-period before a defective knock sensor is actually defined to be nonfunctional.

It is still another object of the invention to provide methods for improving the operating behavior and to assist in diagnosing and compensating for sensor failure (even if the failure is only temporary) by use of an electronic memory within the vehicle for later analysis by the diagnostician.

Still other objects will be evident from the specification and drawing in this case.

DRAWINGS

The invention is illustrated in more detail by reference to the drawing in which:

The FIGURE is a diagram plotting the interaction of four operating parameters vs. time. The "a" abscissa represents engine speed or RPM. The "b" abscissa represents the signal of a knock sensor. The "c" abscissa represents the output signal of a fault recognizer for the knock sensor, and the "d" abscissa represents the ignition timing or charge pressure reduction or increase.

SUMMARY

The method of this invention provides for the shift in the ignition timing in response to a disruption in the knock control sensor over knock-susceptible (or knock-inducing) ranges in the operating conditions of a knock-controlled I.C. engine so that unpleasant jumps in torque are avoided.

The method monitors several parameters of the operating condition of the I.C. engine such as engine RPMs and/or charge pressure, as in the case of supercharged engines, with respect to the output signals of the knock sensor and fault recognizer in the knock-controlled I.C. engine. Adjustments are made to the ignition timing and/or charge pressure according to the output signals received by the knock control sensor during operation in knock-susceptible operating regions, i.e. where the RPM and/or charge pressure has exceeded a threshold value.

Unlike present state-of-the-art knock-control technology for I.C. engines, the shift (retardation) in the ignition timing in the present invention does not change immediately to a fixed maximum value during engine operation in a knock-susceptible range, but rather the timing is pulled-back (retarded) incrementally over time. Even during brief failures of the knock sensor, sudden jump-like changes between an initial fixed value to extreme (full) retardation of the ignition timing and a subsequent resetting are avoided in favor of step-wise incremental retardation.

Much more gentle transitions in the operating condition are achieved, even when immediate interruptions to the incremental retardation of ignition timing occur due to the reactivation of the knock sensor. No engine damage occurs if the ignition timing is retarded incrementally. This is in contrast to prior art teachings which viewed a knock sensor failure as a purely emergency operation whereby the ignition timing was immediately reset to a fixed maximum value to avoid knocking. Thus, the prior art accepted some abuse to the engine due to sudden jumps in torque as well as losses in driver comfort in order to avoid engine knock.

The present method also eliminates wild swings in torque if the failed knock sensor suddenly begins to work again during a knock-susceptible range of operating conditions, since the readvancement of the ignition timing to the characteristic baseline value also takes place incrementally.

In the preferred method of the present invention, the ignition timing is set as conventional for regions of operating conditions where the knock control is inactivated, including the regions where the power requirement and the engine speed are too low to give rise to knocking. Upon entering a region of operating conditions that requires knock control (i.e. at higher power requirements or higher RPMs above a threshold value) the ignition timing is incrementally retarded (with an added safety factor) to prevent early ignition in all cases.

An additional improvement in the operating behavior and an additional safety margin are provided by including a certain monitoring time-period before the knock sensor is actually defined as defective by the fault recognizer. The invention also compensates for a temporary failure of the knock sensor. Data of knock sensor failures during actual engine operation are stored in an appropriate electronic memory within the vehicle and may be retrieved later as output as part of a diagnostic procedure, so that even if the knock sensor has since begun to work again, a checkout will be performed at the next maintenance visit to the workshop.

DETAILED DESCRIPTION OF THE BEST MODE

The following detailed description illustrates the invention by way of example, not by way of limitation of the principles of the invention, and is described by reference to the FIGURE.

The FIGURE shows a diagram of the interaction of the relevant operating parameters. The curve above the "a" abscissa shows the RPM of the I.C. engine plotted along a time axis, and for our present discussion it is important only that the RPM fluctuates about a threshold value denoted as the line $A_{TH}$ along the vertical axis. Below the threshold value $A_{TH}$, knock-control does not take place since the RPM is so low that knocking does not occur. Above the threshold $A_{TH}$, knocking can occur in the I.C. engine. It is in this range that the knock control is active.

According to the FIGURE, engine knock is controlled in the RPM ranges corresponding to regions A, D, E and F along the horizontal or time axis. While the curve above the "a" abscissa only represents the RPM as an example, it is understood that in practice, the power requirements will have to be included. This can be accomplished by placement of a load sensor in the intake manifold of the I.C. engine to differentiate between the knock-susceptible and knock-free operating modes.

The curve above the "b" abscissa plots the signal of the knock sensor, and in the present case a damaged knock sensor is shown. In region I (i.e., where the knock sensor has failed) the knock sensor generates no evaluable signal. In region II (i.e., where the knock sensor suddenly starts working) the knock sensor provides knock-signals that lead to an appropriate control of the operating parameter(s), such as ignition point resetting and/or supercharger pressure setting.

The curve above the "c" abscissa shows the output signal of a fault recognizer for the knock sensor. In the regions where the RPM remains below the threshold value $A_{TH}$, the fault recognizer is not needed for the knock sensor, since the knock sensor's signal is not involved in the operation of the I.C. engine. Thus, in regions A, C and G where the RPM is below the threshold value $A_{TH}$, the signal of the fault recognizer is at a constant minimum level indicating an "off" position for the fault recognizer. In contrast, in regions where the RPM exceeds the threshold value (i.e., regions B, D, E and F), the fault recognizer outputs an appropriate sensor failure signal if no evaluable signal is received from the knock sensor. But, in region II of the knock sensor curve or "b" curve (also denoted as region E along the horizontal or time axis), the fault recognizer is shifted to the "off" position when the knock sensor begins working.

The curve above the "d" abscissa shows the influence on a corresponding operating parameter setting, in this case, on the setting of the ignition timing by the method of this invention.

For this operational example we have the following chronological sequence: In region A the RPM is below the threshold value $A_{TH}$, that indicates the beginning of a knock-susceptible operating range of the I.C. engine. As mentioned above, the same also applies in this case for the power requirement, i.e. the underpressure reading. The knock sensor (see the curve above the "b" abscissa) registers no signals in region A. As the fault recognizer is not active in this region (i.e., knocking does not occur at such low RPMs or power requirements), the signal from the knock sensor is of no interest. The ignition timing is controlled independently of the knock control according to other operating parameters.

In region B the RPM has exceeded the threshold value $A_{TH}$ and therefore a response from the knock sensor is expected. The signal from the knock sensor is processed accordingly in order to differentiate between knocking and non-knocking. However, as the "b" curve shows, if there is no evaluable signal from the knock sensor, then the fault recognizer responds (see curve "c") and outputs (sends) an appropriate signal to warn of the impending knocking likely to occur.

As a result, the ignition timing is retarded in a stepwise fashion (denoted as a stepwise increase in curve "d") to a predetermined maximum retarded value to avoid a knocking operation of the ICE in all cases. However the method takes into account that the ICE is not operating at its optimum performance. Thus, the method of setting (retarding) in this invention does not take place immediately with the arrival of the signal from the fault recognizer, but rather only after a certain number of ignition firings. This period is indicated as t on abscissa d of the FIGURE. In order to avoid sudden changes in the operating condition (i.e., sudden changes in engine torque), the ignition timing is not adjusted suddenly to the maximum preset retarded value, but rather it is adjusted ("raised", meaning retarded) gradually to the final preset value, so that jumps in operating behavior are prevented. The ignition timing retains this preset maximum retarded value until the RPM drops back below the threshold $A_{TH}$ in region C; thus the fault recognizer no longer sends a failure signal since the knock sensor signal is ignored anyway. Here the ignition timing is advanced and goes back to values obtained from other operating parameters independently of the knock control. But in accord with the invention this transition does not occur suddenly; rather, it occurs gradually in increments, which may be provided by standard digital engineering techniques.

As soon as we arrive in region D where the RPM again exceeds the threshold value $A_{TH}$, the ignition timing for a failed knock sensor is reset incrementally back to the maximum retarded value. Now, if knock sensor suddenly starts working again in this range and a corresponding sensor output signal is generated (i.e. range II of the knock sensor or "b" curve), then control at the preset maximum retarded value is switched back to control by the knock controller. The ignition timing at the corresponding region E (see the "d" curve) is supplied by the knock control overriding the incremental retarding or advancing. Now if the knock sensor suddenly fails again during this operation, as it has at region F, then incremental ignition timing retarding takes place to the preset maximum safety value in the region, but only after a brief expiration of a time t in which the knock sensor is checked several times.

Finally, G denotes a region where the RPM again falls below the threshold value $A_{TH}$, so that the knock control does not affect the operating parameters. In our example the ignition timing is incrementally advanced as represented by the stepwise fall in curve "d".

While in the above example only the RPM time curve is plotted, it is understood that other operating parameters such as charge pressure may be likewise plotted along a time diagram as the "curve" on abscissa d, and likewise correlated to the operating curves of the knock sensor and fault recognizer. That is, the curve on abscissa d can also represent charge pressure increase/decrease and vice versa.

According to the foregoing detailed description, it is now evident that by incrementally adjusting the operating parameters it is possible to avoid unpleasant and engine-damaging transitional states affecting driving comfort, even upon failure of a knock sensor. Unlike previous fault recognition circuits for knock controls, the invention also permits knock-control operation during an operating phase as soon as a failed knock sensor is reactivated. That is, the knock sensor of an intermittently operating knock control sensor can override the incremental control of ignition or charge pressure, even on an intermittent basis. Previous circuits have shut down the knock control until the ignition was turned off, so that even a short-term failure of the knock sensor led to a long-term, undesirable mode of operation, i.e. operation with no knock control.

It should be understood that various modifications within the scope of this invention can be made by one of ordinary skill in the art without departing from the spirit thereof. I therefore wish my invention to be defined by the scope of the appended claims as the prior art will permit, and in view of the specification if need be.

I claim:

1. Method of operating a piston knock-controlled internal combustion engine having a fault recognition system for defective knock sensors comprising the steps of:
   (a) monitoring said knock sensor for operation;
   (b) retarding or advancing engine ignition timing in response to signals or absence thereof from said knock sensor when said knock sensor is operational;
   (c) providing a signal from said fault recognition system when said knock sensor is at least partially non-operational;
   (d) monitoring at least one engine operating parameter to determine when the engine is operating in knock-susceptible regions;
   (e) incrementally retarding said ignition timing upon receipt of said sensor failure signal from said fault recognition system to provide improved smoothness in torque output from said engine as compared to output from an engine having an intermittent or totally failed knock sensor.

2. Method of ICE knock control as in claim 1 wherein:
   (a) said incremental retardation progresses to a preset maximum value upon said sensor failure signal continuing for sufficient time to reach said maximum value.

3. Method of ICE knock control as in claim 2 wherein:
   (a) said incremental retardation progresses only so long as said engine operates in said knock-susceptible region.

4. Method of ICE knock control as in claim 3:
   (a) providing a time delay after said failure signal is received in said zone of knock susceptibility before initiating said incremental ignition timing retardation.

5. Method of ICE knock control as in claim 3 which includes the added step of:
   (a) overriding said incremental timing retardation to switch knock control to said knock sensor upon sensing said knock sensor is operational.

6. Method of ICE knock control as in claim 5 wherein:
   (a) said switching of control to said knock control occurs incrementallty to provide smooth transition in torque output of said engine.

7. Method of ICE knock control as in claim 4 which includes the added step of:
   (a) overriding said incremental timing retardation to switch knock control to said knock sensor upon sensing said knock sensor is operational.

8. Method of ICE knock control as in claim 7 wherein: incrementally to provide smooth transition in torque output of said engine.

9. Method of ICE knock control as in claim 1 which includes the step of:
   (a) storing knock sensor failure data in an on board memory; and
   (b) recalling said failure data as part of a subsequent diagnostic procedure.

10. Method of ICE knock control as in claim 6 which includes the step of:
    (a) storing knock sensor failure data in an on board memory; and
    (b) recalling said failure data as part of a subsequent diagnostic procedure.

11. Method of ICE knock control as in claim 8 which includes the step of:
    (a) storing knock sensor failure data in an on board memory; and
    (b) recalling said failure data as part of a subsequent diagnostic procedure.

12. Method of ICE knock control as in claim 1 which includes the step of:
    (a) incrementally advancing said ignition timing to a preset baseline value when said engine is operating in a knock-free region.

13. Method of ICE knock control as in claim 4 which includes the step of:
    (a) incrementally advancing said ignition timing to a present baseline value when said engine is operating in a knock-free region.

14. Method of ICE knock control as in claim 6 which includes the step of:
    (a) incrementally advancing said ignition timing to a preset baseline value when said engine is operating in a knock-free region.

15. Method of ICE knock control as in claim 8 which includes the step of:
    (a) incrementally advancing said ignition timing to a preset baseline value when said engine is operating in a knock-free region.

16. Method of operating a piston knock-controlled internal combustion engine operating under charge pressure and having a fault recognition system for defective knock sensors comprising the steps of:
    (a) monitoring said knock sensor for operation;
    (b) retarding or advancing charge pressure in response to signals or lack thereof from said knock sensor when said knock sensor is operational;
    (c) providing a signal from said fault recognition system when said knock sensor is at least partially non-operational;
    (d) monitoring at least one operating parameter to determine when the engine is operating in knock susceptible regions;
    (e) incrementally decreasing said charge pressure upon receipt of said sensor failure signal from said fault recognition system to provide improved smoothness in torque output from said engine as compared to output from an engine having an intermittent or totally failed knock sensor.

17. Method of ICE knock control as in claim 16 wherein:
    (a) said incremental charge pressure reduction progresses to a preset minimum value upon said sensor failure signal continuing for sufficient time to reach said minimum value.

18. Method of ICE knock control as in claim 17 wherein:
    (a) said incremental charge pressure reduction progresses only so long as said engine operates in said knock-susceptible region.

19. Method of ICE knock control as in claim 18:
    (a) providing a time delay after said failure signal is received in said zone of knock susceptibility before initiating said incremental charge pressure reduction.

20. Method of ICE knock control as in claim 16 which includes the step of:
    (a) storing knock sensor failure data in an on board memory; and
    (b) recalling said failure data as part of a subsequent diagnostic procedure.

* * * * *